(12) United States Patent
Malik

(10) Patent No.: US 7,949,706 B2
(45) Date of Patent: May 24, 2011

(54) AUTOMATIC ELECTRONIC PUBLISHING

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1390 days.

(21) Appl. No.: 10/950,036

(22) Filed: Sep. 24, 2004

(65) Prior Publication Data

US 2006/0075036 A1    Apr. 6, 2006

(51) Int. Cl.
*G06F 15/16* (2006.01)
(52) U.S. Cl. .................... 709/203; 709/205; 709/225
(58) Field of Classification Search .............. 709/203, 709/225, 205
See application file for complete search history.

(56) References Cited

U.S. PATENT DOCUMENTS

| | | | |
|---|---|---|---|
| 6,185,587 B1 * | 2/2001 | Bernardo et al. | 715/234 |
| 6,684,248 B1 * | 1/2004 | Janacek et al. | 709/225 |
| 7,167,903 B2 * | 1/2007 | Percival | 709/217 |

\* cited by examiner

*Primary Examiner* — Adnan Mirza
(74) *Attorney, Agent, or Firm* — Woodcock Washburn LLP

(57) ABSTRACT

Embodiments of the present disclosure provide systems and methods for publishing an electronic document. Briefly described, in architecture, one embodiment of the system, among others, can be implemented as follows. A distribution module retrieves a distribution list identifying at least one user that is to be notified about the publication of the electronic document. As such, when a transfer module sends the electronic document to a network location, a messaging module automatically notifies the at least user from the distribution list of the publication of the electronic document and provides instructions to the at least one user for retrieving the electronic document from the network location. Other systems and methods are also provided.

17 Claims, 12 Drawing Sheets

AUTOMATIC ELECTRONIC PUBLISHING

TECHNICAL FIELD

The present disclosure is generally related to computer systems and, more particularly, is related to sharing of computer files.

BACKGROUND

Multiple persons often contribute to the preparation of different documents, such as spreadsheets, text files, graphic images, etc. Accordingly, a user often sends an electronic message, such as an email message, with an attachment containing an electronic document to other users so that the user can receive edits and or comments regarding the electronic document. Therefore, a user often sends a multitude of copies of the same electronic document to many different users. Such transmissions inefficiently utilize network resources. Further, many users are restricted from receiving electronic messages having attachments of a large file size.

Thus, a heretofore unaddressed need exists in the industry to address the aforementioned deficiencies and inadequacies.

SUMMARY

Embodiments of the present disclosure provide systems and methods for publishing an electronic document. Briefly described, in architecture, one embodiment of the system, among others, can be implemented as follows. A distribution module retrieves a distribution list identifying at least one user who is to be notified about the publication of the electronic document. As such, when a transfer module sends the electronic document to a network location, a messaging module automatically notifies the at least one user from the distribution list of the publication of the electronic document and provides instructions to the at least one user for retrieving the electronic document from the network location.

Embodiments of the present disclosure can also be viewed as providing methods for publishing an electronic document. In this regard, one embodiment of such a method, among others, can be broadly summarized by the following steps: transferring an electronic document to a network location for publication; in response to transferring the electronic document, notifying at least one user on a list of users of the publication of the electronic document; and providing instructions to the at least one user on the list of users for retrieving the electronic document from the network location.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
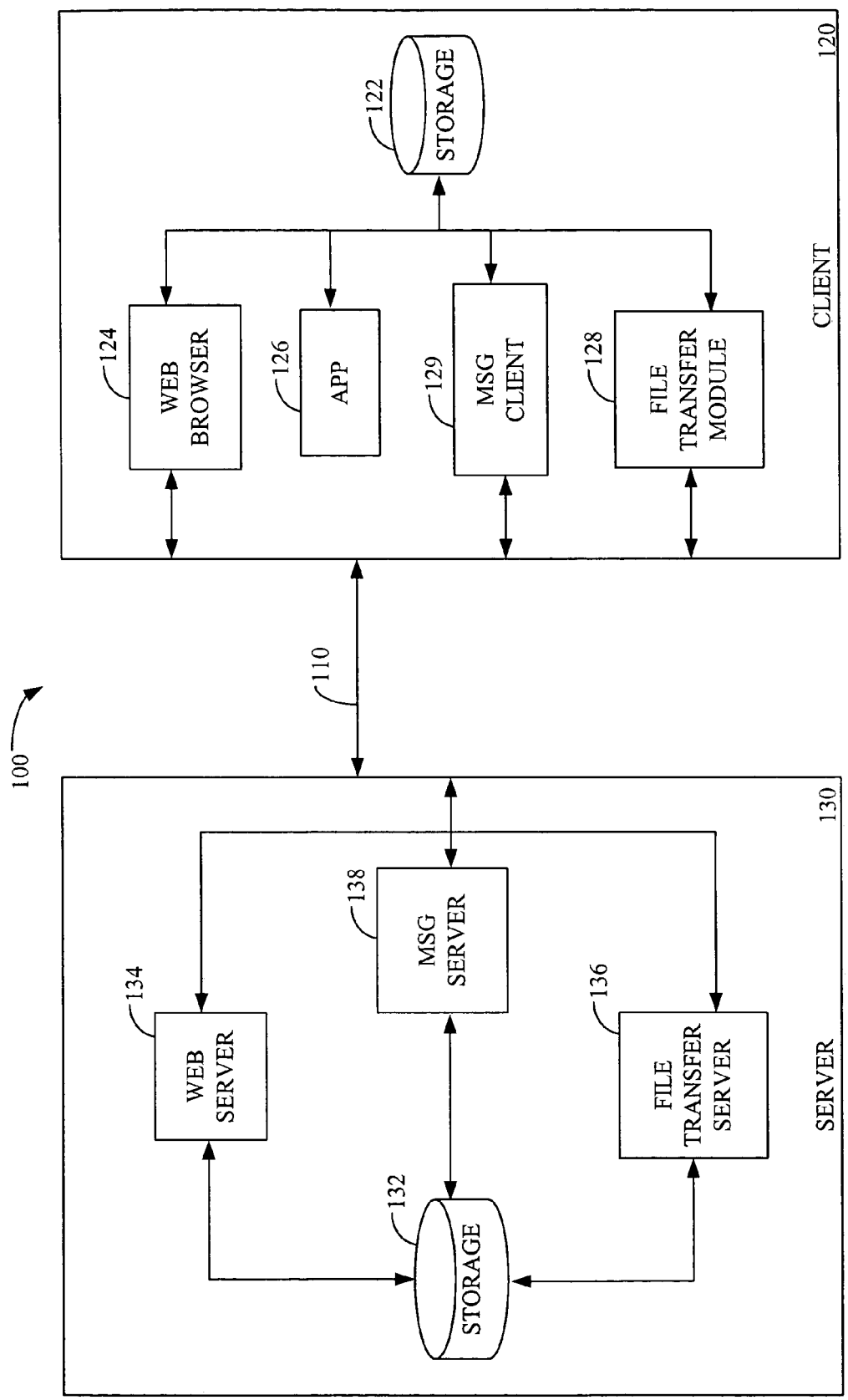
FIG. 1 is a block diagram of one embodiment, among others, of an electronic publishing system 100 for sharing access to an electronic document.

FIG. 1 is a block diagram showing one embodiment, among others, of an electronic publishing system 100 for sharing access to an electronic document. As shown in FIG. 1, a computer network 110, such as the Internet, is provided. The electronic publishing system 100 further includes at least one client system 120 and at least one server system 130 connected to the computer network 110. The server system 130 provides services for the client system 120 via the network 110. The server system 130 includes a storage 132 for storing files, a web (or WWW) server 134 for reading files from the storage 132 and sending the files to the client system 120, a file transfer server 136 for receiving information from the client system 120 and storing the information in the storage 132, a messaging server 138 for sending electronic messages to and receiving electronic messages from the client system 120.

The client system 120 includes storage 122, a web (or WWW) browser 124, an application unit 126, a file transfer module 128, and a messaging client 129. The web browser 124 receives files from the web server 134. The storage 122 stores the files received by the web browser 124. The application unit 126 reads files stored in the storage 122 and executes an application to access the files. For example, for different embodiments, the application unit 126 may be an image viewer, a text editor, a movie player, etc. The file transfer module 128 reads updated files from the storage 122 and sends the updated files to the server system 130. The messaging client 129 sends messages to the messaging server 138 and receives messages from the messaging server 138.

In the system described above, when the client system 120 sends a request for file transfer to the server system 130, the web server 134 reads a file from the storage 132, and sends the file to the client system 120. In the client system 120, the web browser 124 receives the file, stores it in the storage 122, and communicates with the web server 134.

The application unit 126 reads the file from the storage 122, and, then, executes an application to view, play, or edit the file or to access the contents in a particular way. An edited or updated file is stored in the storage 122 again. The file transfer module 128 reads the updated file from the storage 122, and transfers the file to the server system 130 via file transfer server 136. The file transfer server 136 stores the file in storage 132. The file transfer server and module may employ the file transfer protocol (FTP), which is a protocol used for a file exchange between host machines on a TCP/IP-based network.

In addition to the file transfer system described above, an electronic document in the web server 134 can be transferred to the client system 120 when the web browser 124 of the client system 120 requests the electronic document by using a uniform resource locator (URL). Then, an application unit 126 is used for editing the file and storing the file in the storage 122. An operating system (OS)-built-in function or a web browser application having an FTP function is used to send the electronic document from the client system 120 (executing web browser 124) to the server system 130 (executing the web server 134).

Figure 2:
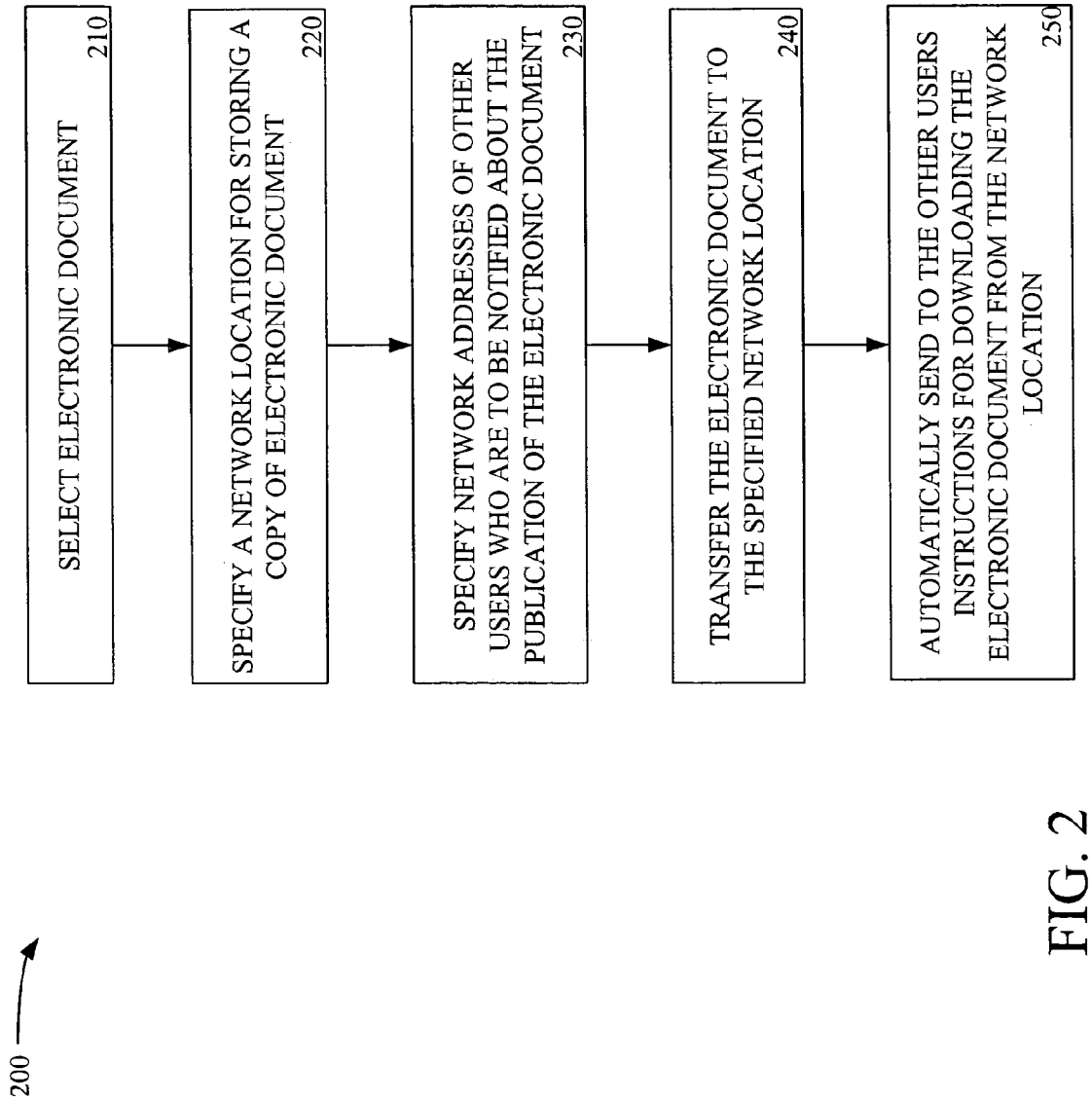
FIG. 2 is a flowchart describing the functionality of one embodiment, among others, of the electronic publishing system of FIG. 1.

Referring now to FIG. 2, one embodiment, among others, of a flowchart describing the functionality of the electronic publishing system 100 is provided. First, a user selects (210) an electronic document from storage 122. The electronic document can be any computer file contained in storage 122, for some embodiments. For example, the electronic document may be a media file, such as a text file, a video file, a presentation slideshow, a music file, etc. that is capable of being viewed/played and/or edited by other users. Next, the user specifies (220) a network location for storing a copy of the electronic document on the computer network 110 so that other users may download a copy of the electronic document from the network location. The network location can be specified as a domain name and path for the network storage space. The user further specifies (230) network (or electronic) addresses of other users who are to be notified about the availability or publication of the electronic document at the network location. For example, network addresses can be email addresses and/or instant message addresses, for different embodiments, among others. Via the specified network addresses, the other users are to be provided notification messages containing instructions for accessing the electronic document at the network location. Therefore, upon a user command, the electronic document is copied or transferred (240) to the network location specified by the user. In addition, notification messages are automatically sent (250) to specified users with instructions for downloading the electronic document from the network location. The publication and notification operations, for various embodiments, are launched as background processes within the client system 120.

Figure 3:
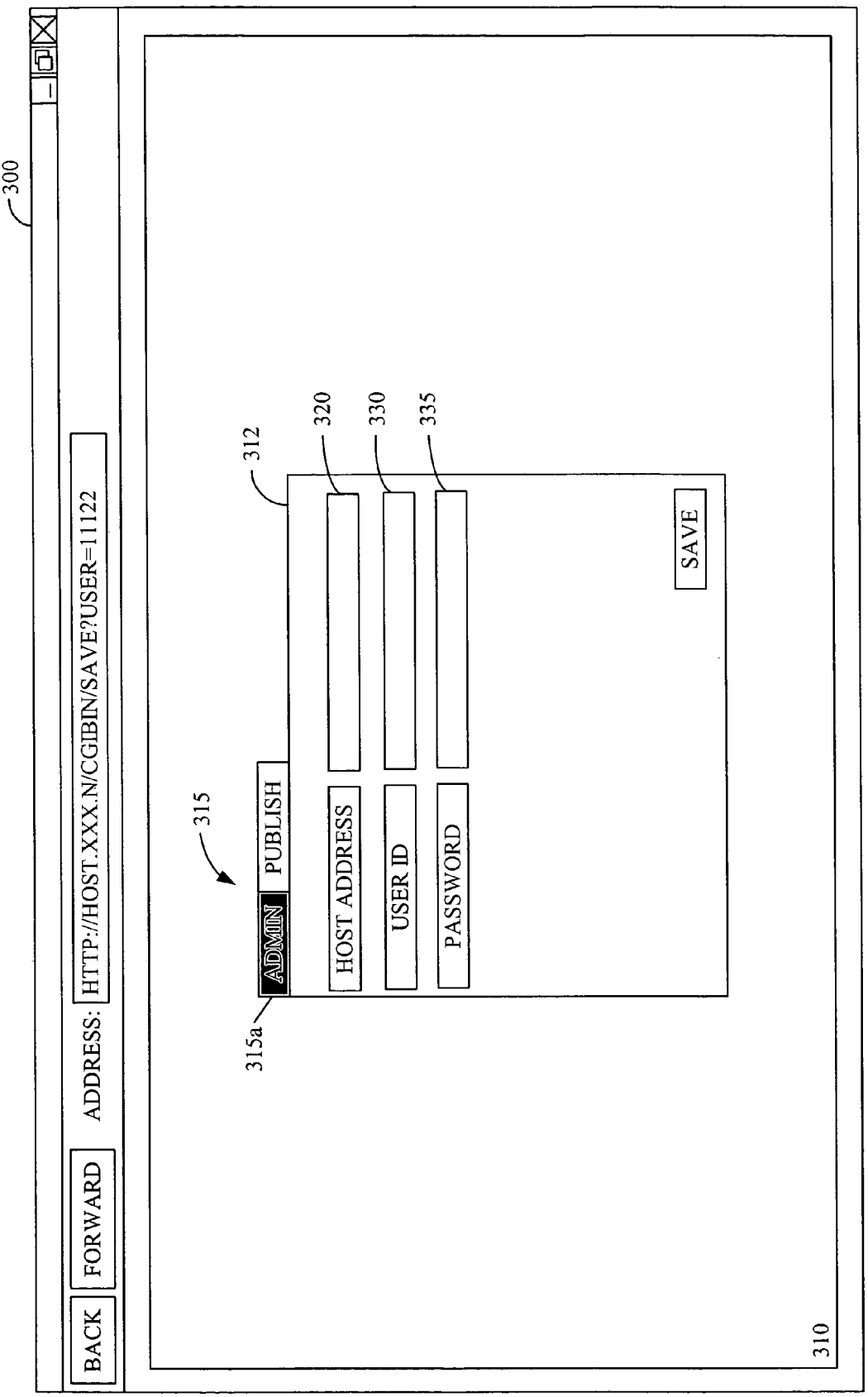
FIGS. 3-4 are diagrams of one embodiment, among others, of a user interface for publishing an electronic document in the system of FIG. 1.

To implement the process of FIG. 2, various embodiments of the electronic publishing system 100 may be employed. For example, FIG. 3 shows select components of one embodiment, among others. In FIG. 3, a user interface 300 for client system 120 is provided in the form of a web page 310 retrieved by a web browser 124 from a web server 134. On the web page 310, a user control 312 is shown for configuring settings associated with the publication of an electronic document. The user control 312 has tabs 315 that can be selected by a user. Each tab, when selected, presents different configurable settings to the user. For example, in FIG. 3, the ADMIN Tab 315a has been selected and shows options for specifying a network location for storing an electronic document. As shown, an input box 320 is displayed so that a user can identify the address of a host server for the network location, such as the domain name or a Hypertext Transfer Protocol (HTTP) address of a file server that is the host of the user's network storage space. For the specified host, the user also provides his user-ID and password for logging in to the host server via input boxes 330, 335. The web browser interface 300 sends setting information to web server 134, where web server 134 saves the setting information in an account of the user. Therefore, the user can store pertinent setting information with a web server 134 for automatically publishing an electronic document.

Figure 4:
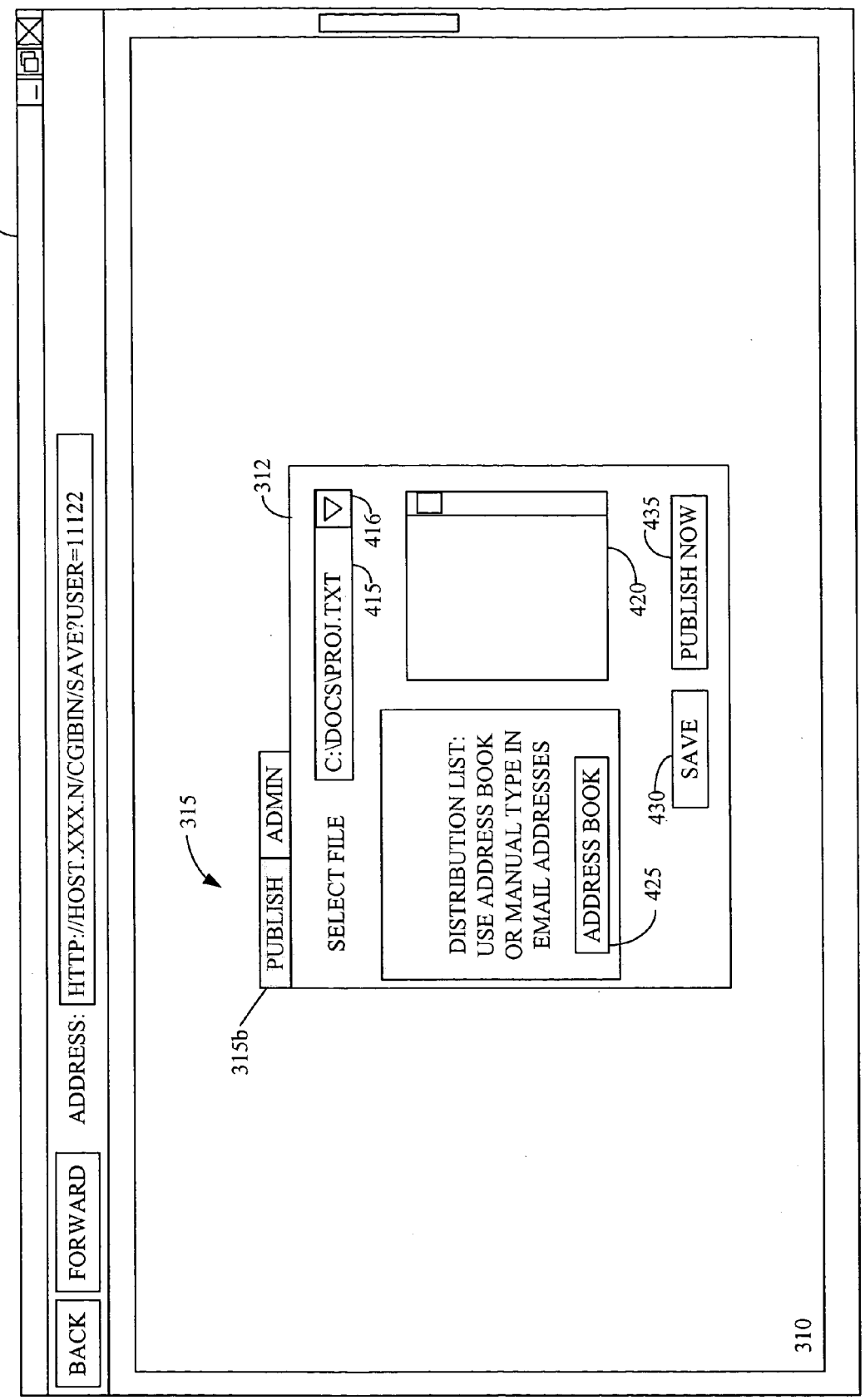

Accordingly, in FIG. 4, the PUBLISH tab 315b has been selected and options are presented for configuring settings to post or publish an electronic document to the network storage space identified on the Admin screen of FIG. 3. As shown, a user can select an electronic document (from a local storage space) by manually typing in the name and location of the electronic document in an input box 415 or by utilizing a dropdown menu (by selecting the Dropdown Menu button 416) that enables a user to choose the electronic document from a local file directory. Further, the user can specify others users who are to be allowed to view the published document after the electronic document has been published at the network storage space. Typically, the user is prompted to specify network or electronic addresses, such as email or instant messaging addresses, for addressing electronic notifications that are sent to the other users. The list of electronic addresses may be generally referred to as a distribution list. As shown, an input box 420 is provided for specifying one or more network addresses for receiving electronic messages (e.g., email addresses, among others). To compose the distribution list, the web page 310 may also provide an Address Book button 425. For example, in some embodiments, the web server 134 may maintain an address book or list of network addresses of persons for the user. Therefore, upon selection of the Address Book button 425, the web browser 124 provides a user interface for selecting entries from the address book and placing the selected entries in the distribution list. To save the current settings that have been specified by a user, the user can select the SAVE button 420. Selection of the SAVE button 420 causes setting information to be saved by the web server 134 so that the setting information can be accessed at a later time. Publication of a selected electronic document and automatic notifications of publication occur after the user selects the PUBLISH NOW button 435 (and the user has provided the pertinent information in the input boxes for distribution and notification).

For some embodiments, after selection of the PUBLISH NOW button 435, the web browser 124 directs the file transfer module 128 to upload or transfer the specified electronic document to the specified network location, as designated in the user control 312. Further, the web browser 300, in one embodiment, among others, directs the messaging client 129 to send notification messages to the addresses listed on the distribution list. The notification messages, for some embodiments, contain an embedded link (e.g., a URL link) to the network location of the electronic document. Upon selection of the embedded link, a web browser is activated and directly retrieves the electronic document or retrieves a web page providing a hyperlink to the electronic document. Correspondingly, in another embodiment, among others, the distribution list is transferred to a web server 134 after the PUBLISH button 315b has been selected by the user. The web server 134 directs the messaging server 138 to send the notification messages to the users on the distribution list in a similar manner as described above.

In accordance with other embodiments, the user control 312 for specifying publication settings, may be a software module on a user's personal computer (not shown). In this regard, the software modules is installed on a user's personal computer and, thereafter, are launched by the user. Further, setting information may be stored locally on a user's personal computer in lieu of being stored at a server location.

Figure 5:
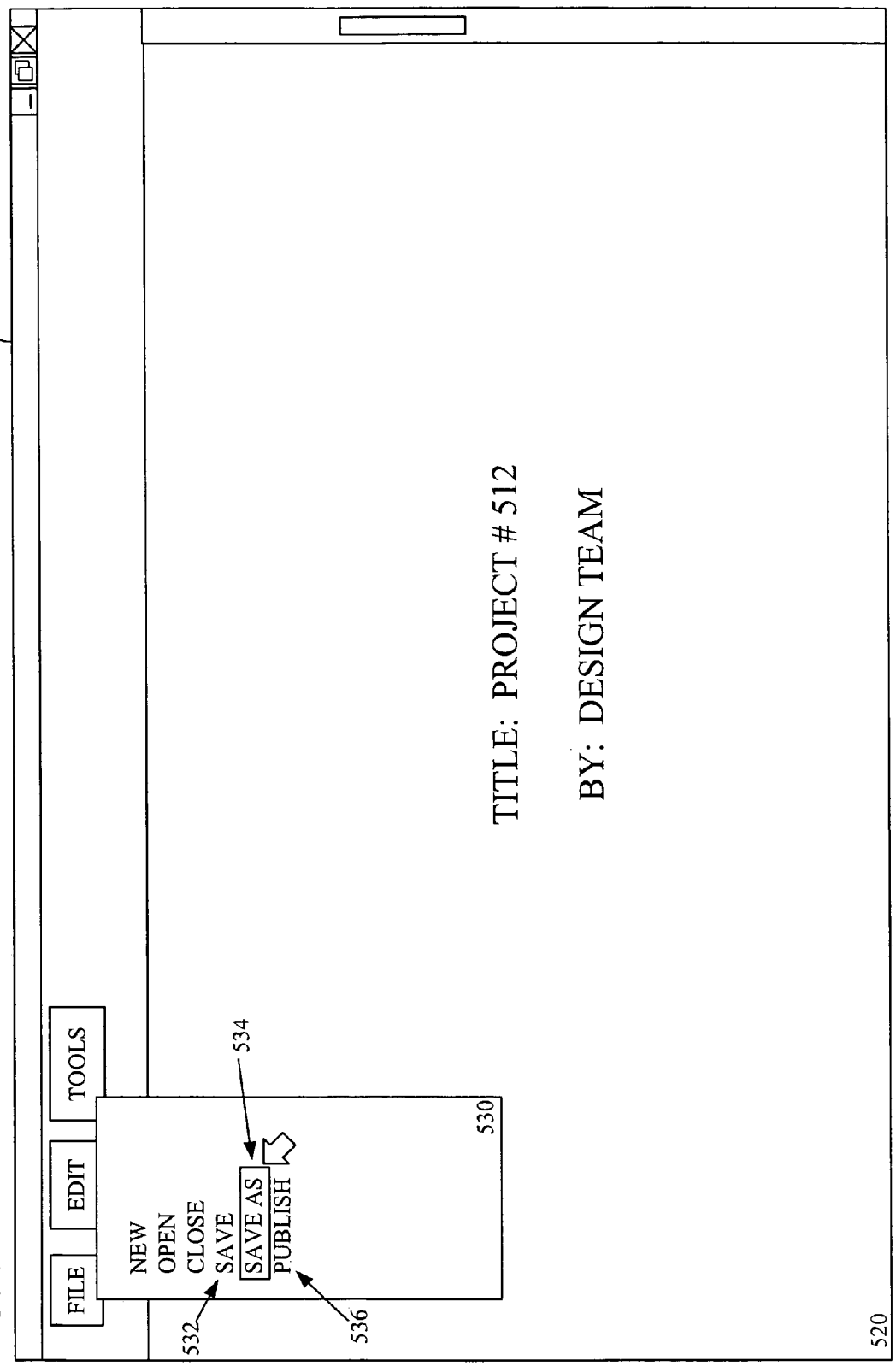
FIGS. 5-7 are diagrams of one embodiment, among others, of an application unit interface for publishing an electronic document in the system of FIG. 1.

Next, FIG. 5 describes another embodiment of selected components in client system 120 for implementing the process of FIG. 2. In FIG. 5, a user can open an electronic document, such as a text file 520, with an application unit 126, such as a text editor 510. With the text editor 510, the user can edit and modify the text file 520. Further, the text editor 510 can be used to create new text files. For example, to save a text file 520 that the user is currently working on with the same file settings associated with the file (e.g., same file format), the user typically selects a SAVE option 534 from a taskbar menu 530 or types in a shortcut code, such as Control S, from a keyboard. In accordance with the present disclosure, a user can also elect to save a file with new associated file settings, such a new file name or file format, for example. Accordingly, a user can select the SAVE AS option 534 from the taskbar menu. In the example shown, a user selects the SAVE AS option 534 which launches a SAVE AS user control 610 to be displayed, as shown in FIG. 6.

Figure 6:
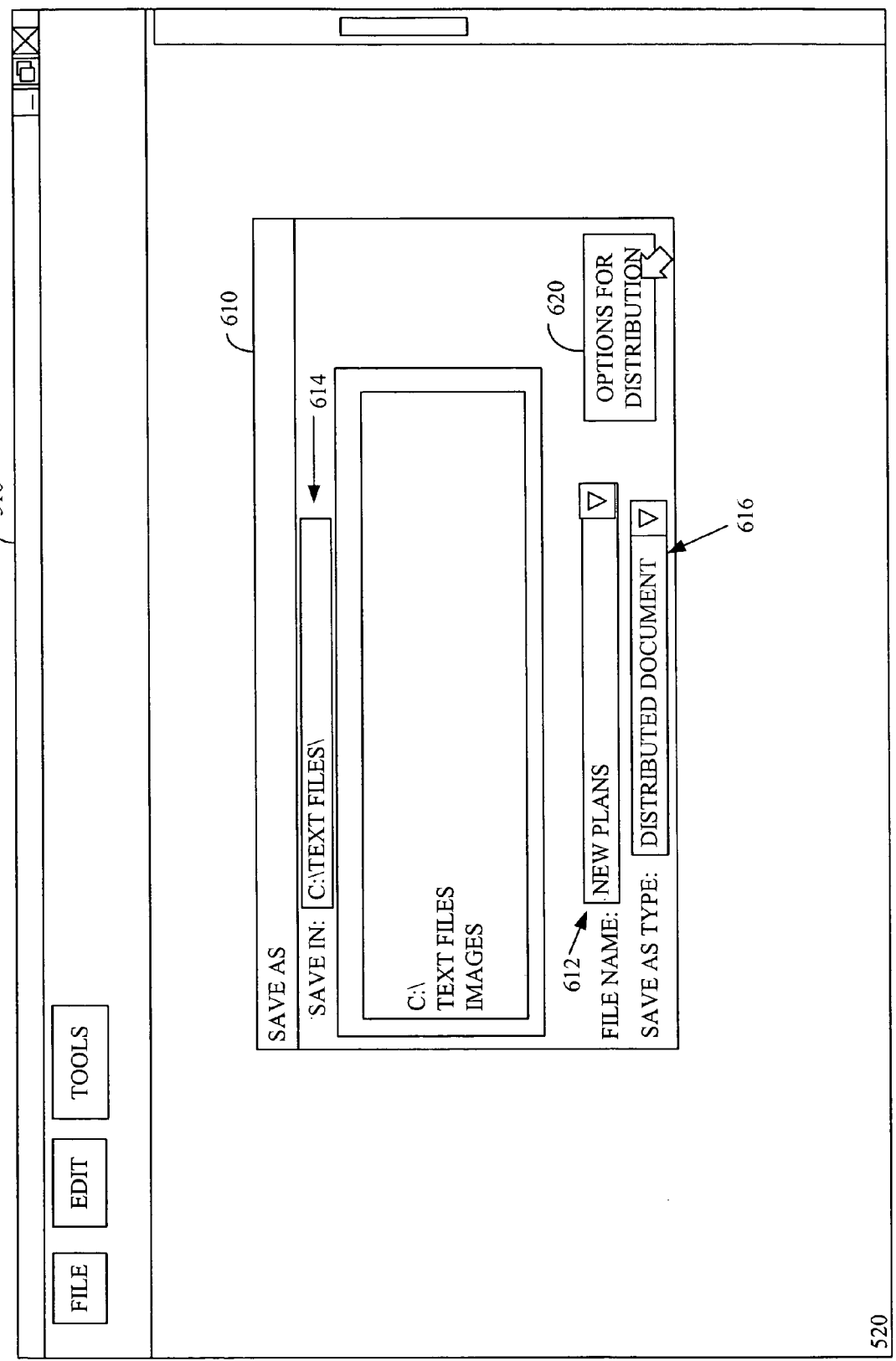

In FIG. 6, a user can specify a filename 612 for the opened document, a local storage space 614 for storing a copy of the document, and a file format 616 for organizing the contents for the document. In the example shown, a user has selected to save the opened document as a "distributed document" that designates that the file is intended to be published to other users, in accordance with various embodiments of the present disclosure. For example, instead of saving the text file as a file format associated with an extension such as .txt, .doc, .rtf, .ws, etc., the text file is formatted at as a distributed document. Accordingly, an electronic document saved as a "Distributed Document" has additional settings associated with the document, as is discussed below.

Figure 7:
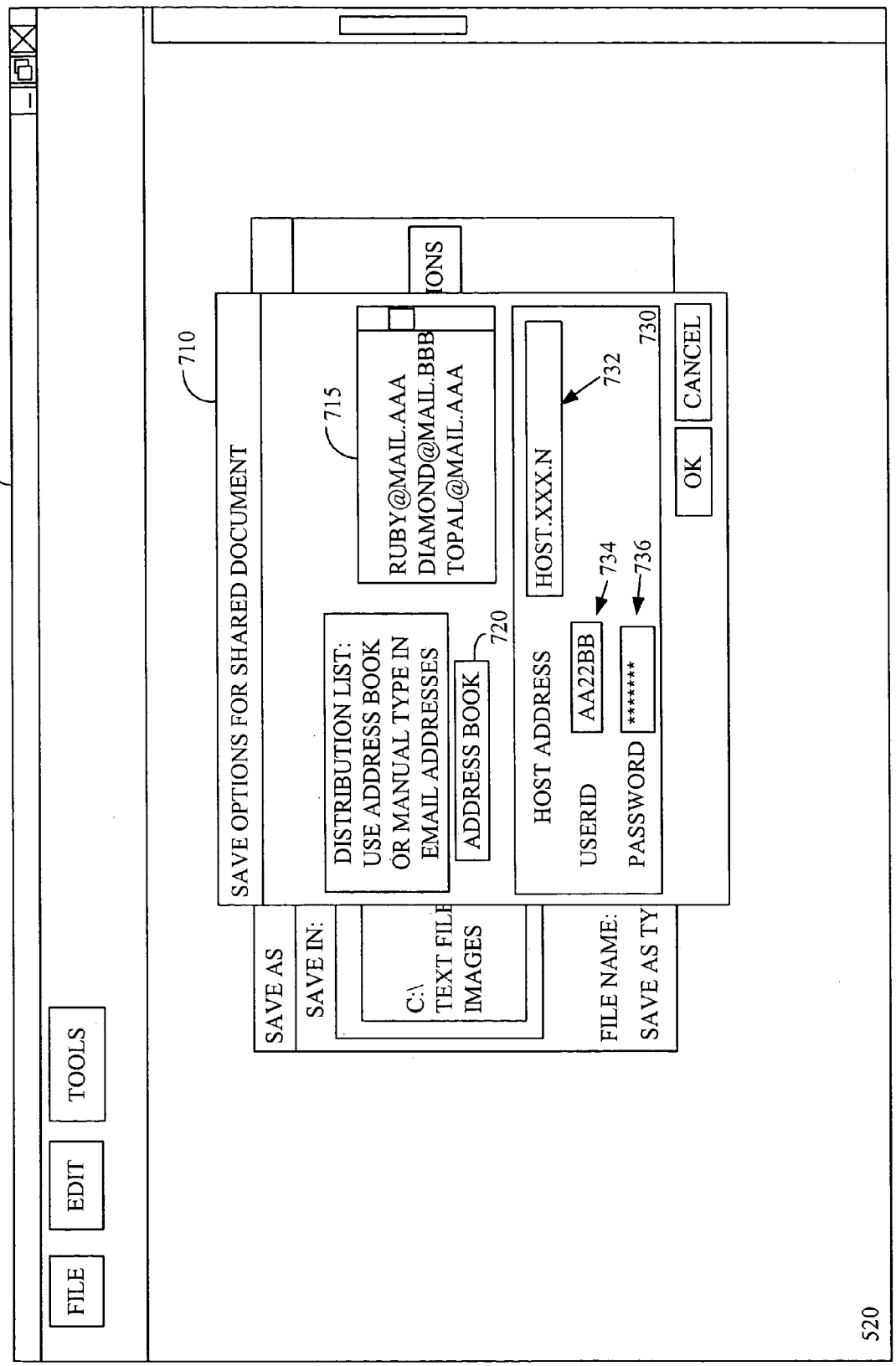

For example, in some embodiments, by selecting an Options for Distribution button 620 on the SAVE AS user control 610, an interface 710 is provided for configuring settings associated with a distributed document, as shown in FIG. 7. Typically, the user is prompted to specify network or electronic addresses (e.g., email addresses, IM addresses, etc.) within a distribution list for sending notification messages to other users. The notification messages are intended to notify recipients that an electronic document has been published and is available for retrieval.

As shown in FIG. 7, an input box 715 is provided for specifying one or more network addresses for receiving electronic messages (e.g., email addresses, among others). To compose the distribution list, the interface 710 may also provide an Address Book button 720. For example, in some embodiments, if a user selects the Address Book button 720, then the interface 710 generates a request to generate an address book user interface (not shown). The address book user interface provides access to locally stored network addresses of other users, such as the email addresses of various friend and family members. As is discussed below, the distribution list for the "distributed document" is saved as part of the electronic document under this file format.

Additional user settings 730 for the distributed document include a host name 732 or address for storing the electronic document on a host server of the communication network 110 along with a user-ID 734 and password 736 for logging into a host server. The network location for storing the document is saved as part of the distributed document, in some embodiments, along with the distribution list. In accordance with the embodiment of FIG. 7, a user who establishes an account with a host server is authorized to not only access a storage space designated for the user on the host server, but also is authorized to grant permission via a "key" to other users to also access the user's storage space. The "key" is provided to other users via notification messages. Further, the "key" may be stored as part of the format of the distributed document as discussed hereinafter.

As shown, to publish an electronic document at a network location and automatically notify other users of its availability, a user can initially designate or save an electronic document as a distributed document and configures the settings associated with the electronic document. Then, as shown in the example of FIG. 5, a user can select a single command (via selecting the PUBLISH option 536 on the file menu 530) to start the publication and notification processes.

After selecting the PUBLISH option 536, the application unit 126, in some embodiments, directs the file transfer module 128 to transfer the electronic document ("distributed document") to the network location specified in the settings that are stored in the formatting of the distributed document, in some embodiments. Further, a key is generated that provides access for others to access the stored electronic document. The client system 120 in some embodiments, and the server system 130 in others, can generate the key, as explained below.

For example, for embodiments where the client system 120 generates and sends notification messages to other users on the distribution list, the application unit 126 (or another software module) can retrieve the distribution list from the contents of a selected distribution document. The messaging client 129 prepares notification messages to the users identified on the distribution list. Within each notification message, the messaging client 129 includes a key that has been generated by the file transfer module 128 and communicated to the file transfer server 136. The file transfer server 136 associates the key with the distributed document that is also sent to the file transfer server 136 by the file transfer module 128 for storing at a network location that is specified in the contents of the distributed document. This network location is also included in the notification messages prepared by the messaging client 129 via a URL link. Therefore, activation of the URL link (by a recipient of a notification message) directs a web browser of a recipient to request the web server 134 to transmit a web page that is associated with the key. The web page provides access to the distributed document to recipients of the notification message. Note, file transfer and notification operations run as background processes on the client systems and are not visible to the user, for many embodiments.

On the other hand, for embodiments where the server system 130 generates and sends notification messages to other users on the distribution list, the distributed document is uploaded to a file transfer server 136 by the file transfer module (after successful log in using user-ID and password) (or other file transfer method). Upon receipt of the distributed document, the file transfer server 136 can retrieve the distribution list and network location from the body of the distributed document. Accordingly, it is understood that the file transfer server 136 is familiar with the structure of the distributed document format, for such embodiments. Further, the file transfer server 136 can direct the messaging server 138 to compose notification messages to the users on the distribution list. The notification messages are to contain embedded links for retrieving a web page from the web server 134. The web page is to provide access to the distributed document. The embedded link may also contains a string identifying a key or authorization code for gaining access to the web page associated with the link. Correspondingly, the web server 134 does not transmit a requested web page without receiving the proper key in the requesting HTTP link.

Additional information may also be referenced in the embedded link as is discussed hereinafter.

Figure 8:
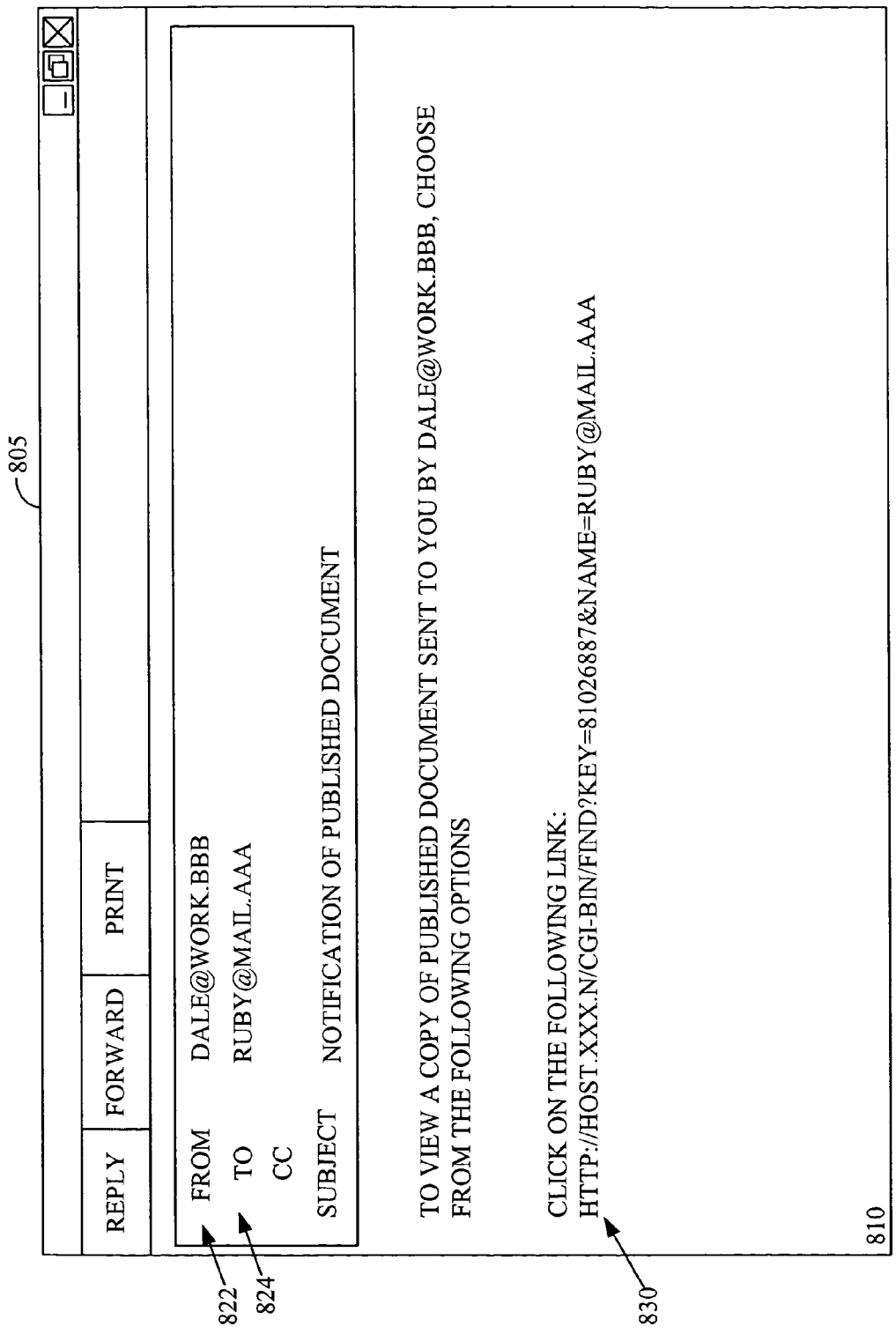
FIG. 8 is a diagram of one embodiment, among others, of a notification message utilized in the system of FIG. 1.

Next, FIG. 8 shows one embodiment, among others, of a notification email message 810, as viewed by an email client interface 805, among others. The notification message 810 displays the person who initiated the sending of the notification message in the From field 822 and displays the recipient of the message in the To field 824. Within the body of the message, an embedded link 830 is provided. For this particular example, the embedded link 830 contains a URL link to a server identified as "HOST.XXX.N" and directs the server to execute a common gateway interface (CGI) script file named "Find" in the cgi-bin directory of the server. In addition, the link provides string arguments for execution of the Find program. In this example, the string arguments include a key or authorization code ("81026887") that has been associated with a distributed document that has been uploaded to a file transfer server. Therefore, the Find program or script instructs a web page to be transmitted to the requesting web browser after authenticating the key provided by the web browser.

Figure 9:
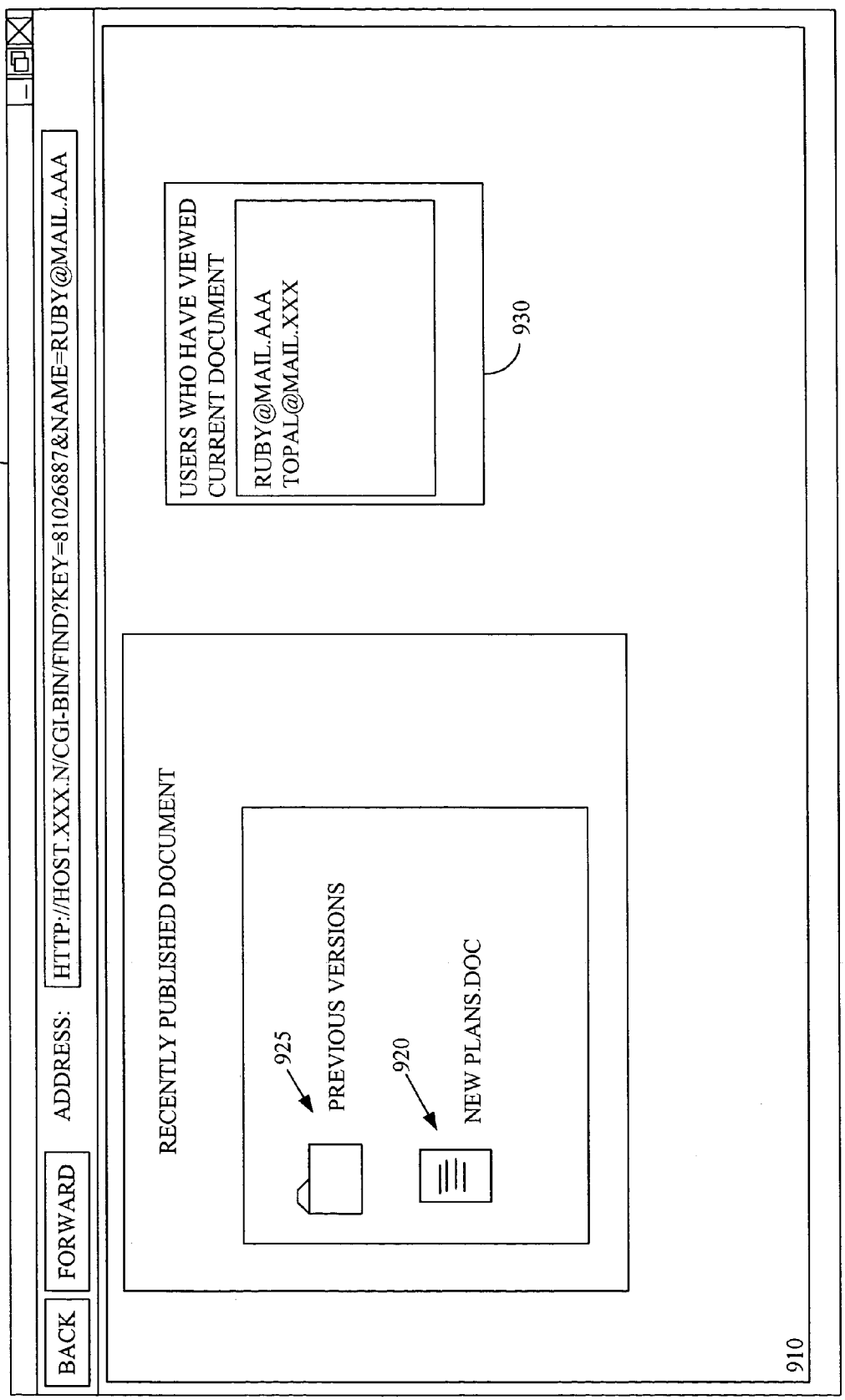
FIG. 9 is a diagram of one embodiment, among others, of a web page utilized in the system of FIG. 1.

Referring now to FIG. 9, a sample web page 910 is provided for accessing a distributed document from a network location (as viewed by web browser interface 915). For this embodiment, after a recipient has selected the embedded link 830 provided in a notification message 810, a web browser of the recipient retrieves a web page 910 from web server 134. In the web page 910 shown, a user is provided an icon 920 that is linked to the recently published electronic document. In alternative, for some embodiments, the web server 134 may provide direct access to the most recently updated document after activation of the embedded link 830.

Referring back to FIG. 9, to view previous published documents, the web server provides a Previous Versions icon 920 that is linked to a web page for providing access to other published documents. In accordance with the present disclosure for some embodiments, the retrieved web page 910 may also track visitors that have viewed the web page 910 providing access to the electronic document, as shown by display box 930. One manner, among others, of a procedure for tracking which users have accessed an electronic document is to include in the embedded link 830 of the notification message, a string identifying the user accessing the link. For example, in FIG. 8, the email address RUBY@MAIL.AAA is contained within a string of the link 830 to identify the recipient of the notification message 810. Therefore, the name or email address can be provided as an argument or string to a web server 134 for composing a web page 910 showing visitor-tracking information. In the example shown in FIG. 9, two users have been noted to have accessed the web page 910 providing access to the electronic document.

Figure 10:
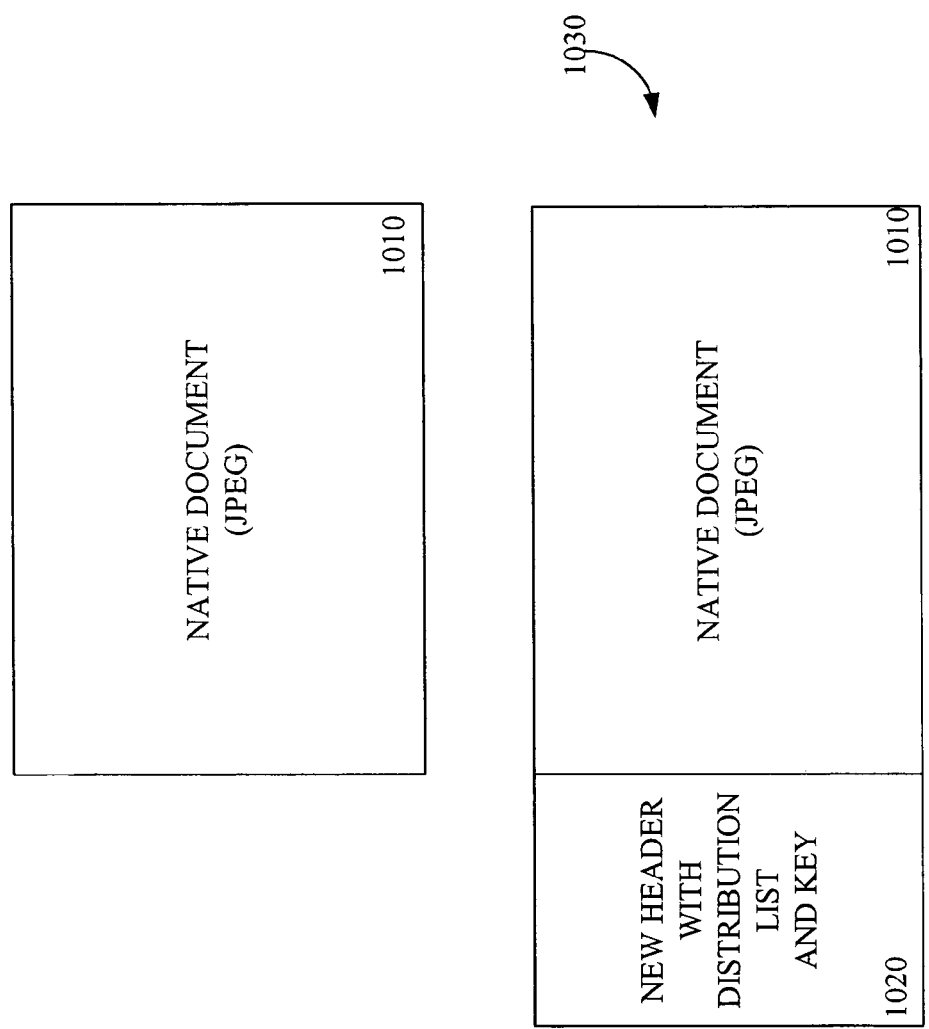
FIG. 10 is a block diagram representation of one embodiment, among others, of a file format of distributed document utilized in the system of FIG. 1.
Figure 11:
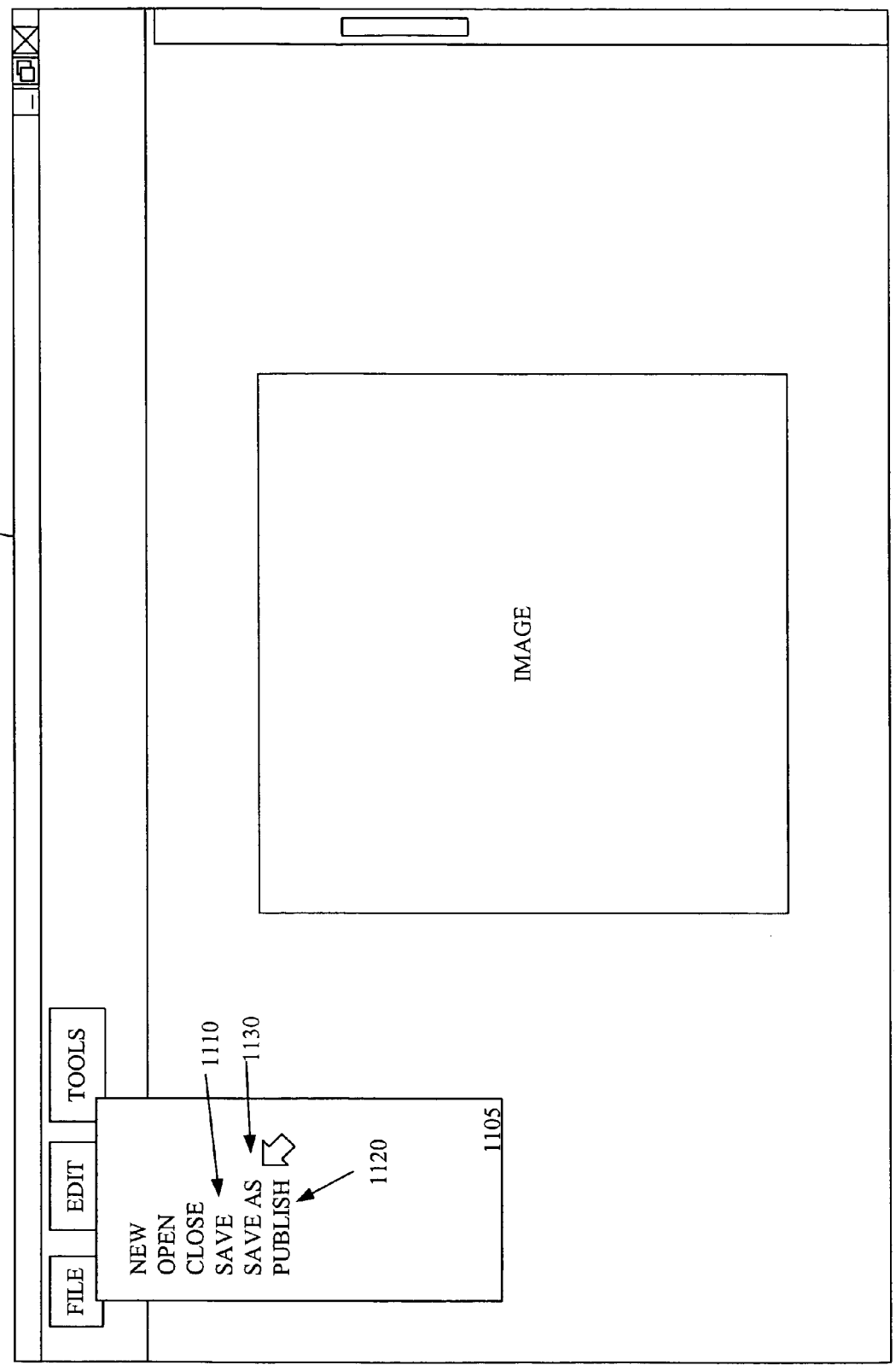
FIG. 11 is diagram of one embodiment, among others, of an application unit interface as utilized in the system of FIG. 1.

In accordance with some embodiments of the present disclosure, as previously discussed, a new file format is provided for electronic documents, that has been labeled a "distributed document." FIG. 10 shows one representation of the file format, for one embodiment, among others. For example, consider a graphic image file or document 1010 in a JPEG format. The JPEG document, in some embodiments, is capable of being viewed with an application unit 126, such as an image viewer 1100, that is configured to view JPEG and other graphic file formats, as shown in FIG. 11. The image viewer 1100 is also configured to convert file formats from one type to another. Therefore, the original document 1010 that is in a JPEG format can be converted to a new distributed (JPEG) document, as represented by document 1030. For some embodiments, the new distributed (JPEG) document contains a network location for publishing the document, a distribution list for automatically publicizing the publication, and a key to authorize others user to access the published document. In the example shown in FIG. 10, a header portion 1020 is added to the original or native JPEG file 1020 to form the distributed (JPEG) document 1030. The new header portion 1020 contains the distribution settings (network location, distribution list, key, etc.) associated with the distributed document. Accordingly, devices that are to access the contents of the new header would be familiar with the size and organization of header contents.

Now, consider a situation where a recipient downloads the electronic document, in a distributed document format, to his or her computer, for example. The user opens the document with an application unit 126, such as image viewer 1100, and makes modifications to the content of the document. The user then decides to publish the document so that others can view the document. Since the user downloaded the document as a distributed document, the document still contains, as part of its file format, the original distribution list, the network location for storing the document, and the key authorizing permission to upload the document to the network location, as indicated by FIG. 10. Therefore, a recipient, in some embodiments, can save the document by selecting "SAVE" 1110 on the file menu 1105 of an image viewer 1100, for example. Thus, after selecting a PUBLISH option 1120 on the file menu 1105, the new/modified/unchanged distributed document is uploaded to the same location as the earlier version of the distributed document. Further, since the distribution list has not changed, the same group of people will be notified about the new publication. As such, for some embodiments, the distribution list of the original document includes the email address of the originator of the original document, so that the originator can receive notifications about any new versions of the document that are produced by other users. Thus, various embodiments provide ability for anyone in the distribution list to publish updates and to automatically notify everyone in a distribution list of an update. Correspondingly, a web server 134 may be configured to automatically indicate on a web page which updates are the most current and to provide a hierarchical view of updates from most recent to oldest.

Now, in a different situation, a recipient who retrieves an electronic document, in a distributed document format, and modifies the content of the electronic document may choose to configure new settings associated with the distributed document. Therefore, a recipient can choose to select the SAVE AS option 1130 on the file menu 1105 of an application unit, such as an image viewer 1105, for example. Thus, the recipient is then able to specify a new distribution list, new network location, and can specify his or her host account information for the SAVE AS operation 1130. After specifying new/modified/unchanged distribution settings, the modified distributed document can be published to the location identified by the user and notification messages can automatically be sent to users on the new/modified/unchanged distribution list along with a newly generated key for gaining access to the newly published document.

Figure 12:
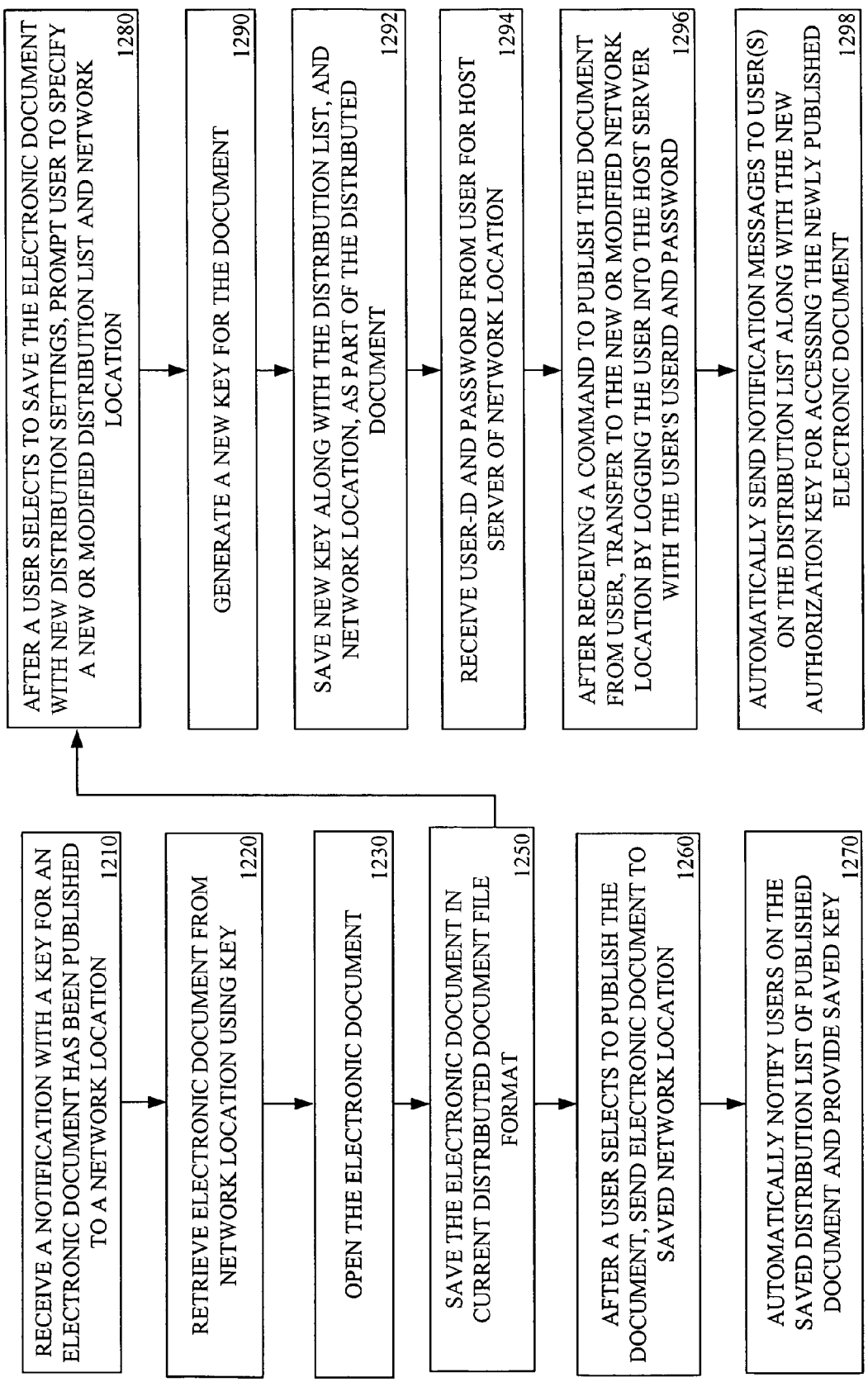
FIG. 12 is a flowchart describing the functionality of one embodiment, among others, of the system of FIG. 1.

Referring now to FIG. 12, one embodiment, among others, of a flowchart describing the functionality of the electronic publishing system 100 is provided. First, a user receives (1210) a notification that an electronic document has been published. Included in the notification is a key to access the published document at a specified network location. For example, the key and network location may be indicated by a hyperlink contained in the notification message. Accordingly, a user retrieves (1220) the electronic document from the network location by providing the key to the host server storing the document. An application unit 126 of the user opens (1230) the electronic document that was retrieved from the host server. The user edits the document and chooses to save (1250) the document with its current formatting. As a result, the user is not prompted to modify the distribution list, network location information, and/or authorization key that are saved as part of the distributed document. Therefore, after a user selects to publish the document, the electronic document, as a background series of processes, is transferred (1260) to the saved network location and notification messages are automatically sent (1270) to users on the distribution list and are given an authorization key to access the published document.

Alternatively, a user can choose to save the electronic document with new distribution settings. As such, the user is prompted (1280) to specify a new or modified distribution list and network location. Further, a new distribution key is generated (1290) for the document and saved (1292) along with the distribution list, and network location, as part of the distributed document. A user-ID and password is also received (1294) from the user for creating a session with the host server of the network location. After receiving a command to publish the document, the application unit 126 directs, in a background series of processes, the distributed document to be transferred (1296) to the new or modified network location by logging the user into the host server with the user's user-ID and password. Further, notification messages are automatically sent (1298) to user(s) on the distribution list along with the new authorization key for accessing the newly published electronic document.

The client system 120 and server system 130 of embodiments of the present disclosure can be implemented in hardware, software, firmware, or a combination thereof In some embodiments, the client 120 and server systems 130 are implemented in software or firmware that is stored in a memory and that is executed by a suitable instruction execution system. If implemented in hardware, as in alternative embodiments, those skilled in the art would appreciate that the client system 120 and server system 130 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For some embodiments, among others, process descriptions or blocks in flow charts are understood as representing modules, segments, or portions of code which include one or more executable instructions for implementing specific logical functions or steps in the process. Alternate implementations are also included within the scope of some embodiments in which functions may be executed out of order from that shown or discussed, including substantially concurrently or in reverse order, depending on the functionality involved, as would be understood by those reasonably skilled in the art. Ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present disclosure are merely possible examples of implementations, merely set forth for a clear understanding of the principles of the disclosure. Many variations and modifications may be made to the above-described embodiments without departing substantially from the principles of the present disclosure. For example, while the foregoing description and accompanying drawings specifically describe electronic messaging involving instant messaging (IM) and email, it will be clear to one of ordinary skill in the art that the systems and methods presented herein may be extended to other messaging techniques and protocols. All such modifications and variations are intended to be included herein within the scope of this disclosure.

Therefore, thus described the invention, at least the following is claimed:

1. A system for publishing an electronic document, the system comprising:
   a processor comprising hardware, the processor executing a distribution module to retrieve, from the electronic document, a distribution list identifying a plurality of users that is to be notified about a publication of the electronic document, wherein the electronic document comprises a header that contains the distribution list;
   a transfer module to send the electronic document to a network location designated for a first user and associated with a unique key for accessing the network location;
   a messaging module to automatically notify the plurality of users from the distribution list of the publication of the electronic document by the first user and to provide instructions to the plurality of users from the distribution list for retrieving the electronic document from the network location designated for the first user via an electronic message, wherein the electronic message contains a hyperlink that references the electronic document from the network location; and
   an application unit for displaying file information to the plurality of users, the application unit configured to modify the distribution list and to save the modified distribution list in the header of the electronic document.

2. The system of claim 1, wherein the messaging module also provides an authorization code to the plurality of users from the distribution list, the authorization code enabling the plurality of users to retrieve the electronic document.

3. The system of claim 1, wherein the hyperlink request a web page providing access to the electronic document.

4. The system of claim 3, wherein the web page displays a list of previous visitors to the web page.

5. The system of claim 1, wherein the application unit is further configured to save the network location as part of the electronic document format.

6. The system of claim 5, wherein the application unit is further configured to save an authorization code as part of the electronic document format.

7. A method for publishing electronic documents, comprising:
transferring an electronic document to a network location designated for a first user for publication by the first user, the electronic document comprising a header that contains a distribution list identifying a plurality of users to be notified about a publication of the electronic document by the first user and are authorized to access the electronic document after publication, wherein the header of the electronic document is configured to store a modified distribution list when a modification is made to the distribution list, and wherein the network location has associated therewith, a unique key for accessing the network location;
in response to transferring the electronic document, retrieving the distribution list from the electronic document;
notifying the plurality of users on the distribution list via an electronic message, wherein the electronic message contains a hyperlink that references the electronic document from the network location; and
providing instructions to the plurality of users on the distribution list for retrieving the electronic document from the network location.

8. The method of claim 7, further comprising:
restricting access to the electronic document to the plurality of users on the distribution list.

9. The method of claim 7, further comprising:
including within the format of the electronic document the address of the network location of the electronic document.

10. The method of claim 7, wherein the restricting access to the electronic document comprises:
providing an authorization code to the plurality of users on the distribution list that is required to access the electronic document, wherein the instructing step includes the authorization code with a uniform resource locator for the electronic document stored at the network location.

11. The method of claim 7, further comprising:
retrieving the electronic document from the network location after the electronic document has been published;
updating the electronic document;
publishing an updated version of the electronic document to the network storage space by utilizing distribution information contained in the format of the electronic document; and
automatically notifying the plurality of users on the distribution list of the updated version by utilizing the distribution information contained in the format of the electronic document.

12. The method of claim 7, further comprising:
retrieving the electronic document from the network location after the electronic document has been published;
editing the electronic document;
modifying distribution information contained within the format of the electronic document;
publishing a new version of the electronic document to a new network location by utilizing the modified distribution information contained in the format of the electronic document; and
automatically notifying users of the publication of the new version by utilizing the modified distribution information contained in the format of the electronic document.

13. The method of claim 7, further comprising:
tracking which users from the plurality of users have accessed the electronic document from the network location.

14. A non-transitory computer readable medium having a computer program for publishing electronic documents, the program for performing:
transferring an electronic document to a network location designated for a first user for publication by the first user, the electronic document comprising a header that contains distribution information, the distribution information comprising a distribution list identifying a plurality of users to be notified about a publication of the electronic document by the first user and are authorized to access the electronic document after publication, the network location designated for publication, and a unique key for accessing the network location, wherein the header of the electronic document is configured to store a modified distribution list when a modification is made to the distribution list;
in response to transferring the electronic document, retrieving the distribution list from the electronic document;
notifying the plurality of users on the distribution list via an electronic message, wherein the electronic message contains a hyperlink that references the electronic document from the network location;
providing instructions to the plurality of users on the distribution list for retrieving the electronic document from the network location; and
restricting access to the electronic document to the at least one user on the distribution list.

15. The medium of claim 14, the program further comprising:
retrieving the electronic document from the network storage space after the electronic document has been published;
updating the electronic document;
publishing an updated version of the electronic document to the network storage space by utilizing the distribution information contained in the format of the electronic document; and
automatically notifying the plurality of users on the distribution list of the updated version by utilizing the distribution information contained in the format of the electronic document.

16. The medium of claim 14 the program further comprising:
retrieving the electronic document from the network location after the electronic document has been published;
editing the electronic document;
modifying the network location designated for publication contained in the header of the electronic document;
publishing a new version of the electronic document to a new network location by utilizing the modified network location designated for publication; and
automatically notifying a plurality of users of the publication of the new version by utilizing the modified distribution information contained in the header of the electronic document.

17. The medium of claim 14 the program further comprising:
retrieving the electronic document from the network location after the electronic document has been published;

modifying the distribution list of the electronic document;

generating a new unique key for accessing the network location;

saving the modified distribution list and the new unique key in the header of the electronic document;

upon publication of the electronic document, automatically notifying a plurality of users of the publication of the electronic document and the new unique key based on the modified distribution list.

* * * * *